United States Patent [19]

Jasper

[11] Patent Number: 4,652,832
[45] Date of Patent: Mar. 24, 1987

[54] FREQUENCY RESOLUTION IN A DIGITAL OSCILLATOR

[75] Inventor: Steven C. Jasper, Hoffman Estates, Ill.

[73] Assignee: Motorola, Inc., Schaumburg, Ill.

[21] Appl. No.: 751,919

[22] Filed: Jul. 5, 1985

[51] Int. Cl.$^4$ ............................................ H03B 19/00
[52] U.S. Cl. ...................................... 328/14; 364/721
[58] Field of Search ............................ 328/14; 333/20; 364/718, 721, 807

[56] References Cited

U.S. PATENT DOCUMENTS

| | | | |
|---|---|---|---|
| 3,562,420 | 2/1971 | Thompson | 358/167 |
| 3,877,022 | 4/1975 | Lehman et al. | 340/347 AD |
| 3,999,129 | 12/1976 | Kasson | 375/56 |
| 4,011,438 | 3/1977 | Aufderheide et al. | 235/152 |
| 4,039,951 | 8/1977 | Bruce et al. | 328/14 |
| 4,315,219 | 2/1982 | Rochelcau et al. | 328/14 |
| 4,331,941 | 5/1982 | Kovalick et al. | 328/14 |
| 4,345,500 | 8/1982 | Alonso et al. | 84/1.01 |
| 4,346,477 | 8/1982 | Gordy | 455/257 |
| 4,410,954 | 10/1983 | Wheatley III | 328/14 |
| 4,449,117 | 5/1984 | Fortescue | 340/347 SY |
| 4,454,486 | 6/1984 | Hassun | 328/14 |
| 4,475,220 | 10/1984 | Mattei et al. | 375/86 |
| 4,484,296 | 11/1984 | Treise et al. | 364/721 |
| 4,506,228 | 3/1985 | Kammeyer | 329/107 |

FOREIGN PATENT DOCUMENTS 0082335   6/1983   European Pat. Off. ............ 364/721

OTHER PUBLICATIONS

"A Digital Frequency Synthesizer", Joseph Tierney, Chas. M. Rader, and Barnard Gold, IEEE Transactions on Audio and Electroacoustics, vol. AU-19, No. 1, Mar. 1971, pp. 48–57.

Schuchman, "Dither Signals and Their Effect on Quantization Noise", IEEE Trans. on Comm. Tech., pp. 162–165, Dec. 1964.

Shimizu et al., "Resolution Improvement in an A/D Converter by the Superposed Dither Signal", Elec. and Comm. in Japan, vol. 64-A, No. 12, pp. 1–8, 1981.

Vanderkooy et al., "Resolution Below the Least Significant Bit in Digital Systems with Dither", J. Audio Eng. Soc., vol. 32, No. 3, pp. 106–113, Mar., 1984.

*Primary Examiner*—John S. Heyman
*Assistant Examiner*—Karl Ohralik
*Attorney, Agent, or Firm*—James E. Jacobson; Donald B. Southard; Thomas G. Berry

[57] ABSTRACT

A method and means for improving the frequency resolution in a digital oscillator is described. According to the principles of the present invention, a digital oscillator may be comprised of a frequency latch, a phase accumulator, and a ROM based waveform generator. Improved frequency resolution is achieved in the digital oscillator, without increasing ROM size by quantizing the summed output of a dither generator and the phase accumulator before sending the resultant multi-bit signal to a ROM. The contents of the ROM are sequentially addressed with the resultant multi-bit signal. The output of the ROMs comprise digital words corresponding to a desired waveform envelope.

14 Claims, 6 Drawing Figures

$$\emptyset = 2\pi \frac{nk}{2N}$$
$$X = \cos\emptyset \quad Y = \sin\emptyset$$

FREQUENCY RESOLUTION IN A DIGITAL OSCILLATOR

FIELD OF THE INVENTION

This invention relates to the field of digital oscillators and specifically to a digital oscillator which provides a sampled sequential digital signal which represents a sinusoid signal for use in heterodyning operations performed in digitally implemented communications equipment. The improved digital oscillator of the present invention relates to the particular class of digital oscillators which are based on ROM look-up table techniques.

BACKGROUND OF THE INVENTION

A new class of communications equipment has developed in which a communications signal may be processed using digitally implemented circuitry. The present invention relates to the generation of a digital signal which comprises samples of the complex sinusoid:

$$w(t) = e^{j2\pi f_c t}$$

where $f_c$ is the desired oscillator frequency.

The above described digital signal may be advantageously utilized for quadrature mixing operations performed in a zero intermediate frequency (I.F.) section of a digitally implemented receiver. According to conventional communications theory, $$e^{j2\pi f_c t} = \cos 2\pi f_c t + j \sin 2\pi f_c t$$

Therefore, the generation of cosine and sine waveforms are special cases (real and imaginary parts, respectively) of the more general complex sinusoid generation. The sampled version of $e^{j2\pi f_c t}$ is obtained by replacing the continuous time variable t by a digital discrete time variable nT, where n is a counting integer (1,2,3,...) and T is the sampling period, which equals 1/fs = 1/sampling rate. The discrete time signal is then equivalent to:

$$w(n) = e^{j2\pi f_c(nT)}$$

ROM lookup methods of generating this signal follow from making the frequency variable $f_c$, as well as the time variable (nT), discrete. If we let $f_c = kf_s/2^N$ (where k is an integer), then:

$$w(n) = e^{j2\pi k f_s(n/f_s)/2^N} = e^{j2\pi nk/2^N}$$

The frequency resolution obtained for the digitally implemented oscillator is equivalent to:

$$\Delta f = f_s/2^N$$

wherein $2^N$ distinct frequencies can be generated.

One type of digitally implemented oscillator provides separate cosine and sine ROM tables, each with $2^N$ words. By exploiting sine-cosine symmetries and allowing two lookups, one for cosine and one for sine, the amount of ROM may be reduced to $\frac{1}{4} \cdot 2^N$ words. That is, either the cosine or sine values for only one quarter of the circle need be stored.

The above mentioned technique is referred to as a direct ROM Lookup. The amount of required ROM may be further reduced by employing a technique referred to as factored ROM lookup. This method provides that the complex phasor $e^{j\phi}$ may be broken into 2 or more factors, each with its own lookup table, whose product is calculated in real time using complex digital multiplications. Therefore, the ROM requirement may be reduced at the expense of the need to perform complex digital multiplications. For example, the phasor $e^{j\phi}$ can be broken into two factors, coarse and fine according to the following equation:

$$e^{j\phi} = e^{j\phi_c} \cdot e^{j\phi_f}$$

If $\phi$ is represented in, say 16 bits, Direct ROM lookup requires at least $\frac{1}{4} \cdot 2^{16}$ or 16,384 words of ROM.

In Factored ROM Lookup, the 16-bit integer representing $\phi$ can be separated into an 8-bit coarse part (most significant bits) and an 8-bit fine part (least significant bits), which address coarse and fine ROM tables, respectively. Therefore, the amount of ROM is reduced to approximately $2 \times 2^8$ or 512 words, at the expense of one complex digital multiply operation. Further discussion of the background of digital oscillators is set forth in an article by J. Tierney et al., entitled "A Digital Frequency Synthesizer", IEEE Trans. Audio and Electroacoustics, March 1971.

An essential characteristic of the conventionally implemented ROM lookup oscillators described above is that as the frequency resolution is increased, the ROM size requirement also increases. For the Direct method, each doubling of resolution leads to doubling of the ROM size. For the Factored method with two factors, doubling the resolution increases the ROM size by a factor of about $\sqrt{2}$.

SUMMARY AND OBJECTS OF THE INVENTION

In Summary, a digital oscillator may be comprised of a frequency latch, a phase accumulator, and a ROM based waveform generator. Improved frequency resolution is achieved in the digital oscillator by quantizing the summed output of a digital dither generator and the phase accumulator before sending the resultant multi-bit signal to a ROM. The contents of the ROM are sequentially addressed with the resultant multi-bit signal. The output of the ROMs comprise digital words corresponding to a desired waveform envelope.

Accordingly, it is an object of the present invention to provide a digital oscillator having improved frequency resolution.

It is another object of the present invention to eliminate the dependence of ROM size on frequency resolution, making possible arbitrarily fine resolution with relatively small amounts of ROM.

It is yet another object of the present invention to provide a digital oscillator which efficiently generates a sinusoidal digital signal using a minimum of circuitry.

It is still another object of the present invention to provide a digital oscillator exhibiting no discrete frequency outputs other than the desired output.

DETAILED DESCRIPTION OF THE DRAWINGS

Figure 1A:
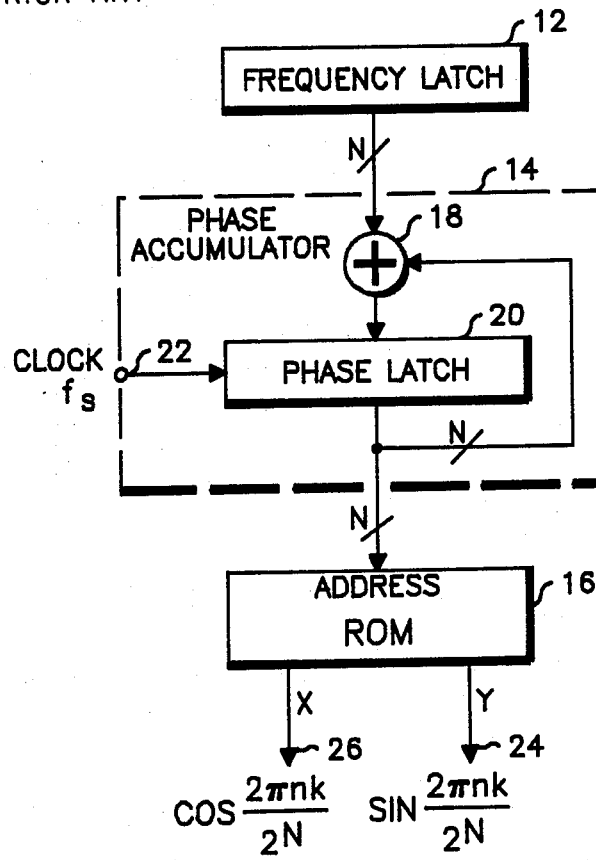
FIG. 1a is a block diagram of a basic digital oscillator circuit.

A digital oscillator based on the direct ROM-lookup approach may by implemented as shown in FIG. 1A. The digital oscillator 10 comprises an N-bit frequency latch which temporarily stores an integer value k corresponding to the desired oscillator frequency, wherein:

$$k = f_c \cdot 2^N / f_s$$

and $f_s$ is the sampling rate (already defined)

The binary integer output of the frequency latch 12 is accumulated at each sampling rate (corresponding to n) into an N-bit phase latch 20, which contains a binary integer $(nk)_{(modulo\ 2N)}$, which is proportional to a phase value:

$$\phi = (nk)_{(modulo\ 2N)} \cdot 2\pi / 2^N$$

Figure 1B:
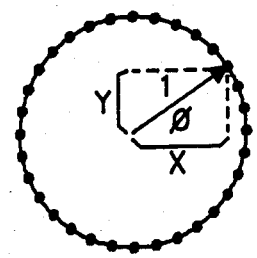
FIG. 1b is an illustration of the sine and cosine phase points on the unit circle.

The N-bit output of the phase latch 20 addresses a ROM 16 containing stored binary values of the sinusoid values $\cos 2\pi nk/2^N$ and $\sin 2\pi nk/2^N$, which are output at terminals 26 and 24 respectively. A digital adder 18 is disposed in the data path between the frequency latch 12 and the phase latch 20. Another input to the digital adder 18 is taken from the output of the phase latch 20. The combination of the digital adder 18 and the phase latch 20 forms a phase accumulator 14. The output of the digital adder 18 produces a sequence of values corresponding to incremental addresses used to sequence the ROM 16. Thus, the ROM-lookup oscillator 10 simply reads out of a ROM the phasor coordinates of $2^N$ points equally spaced on the unit circle, as shown in FIG. 1B.

Figure 2:
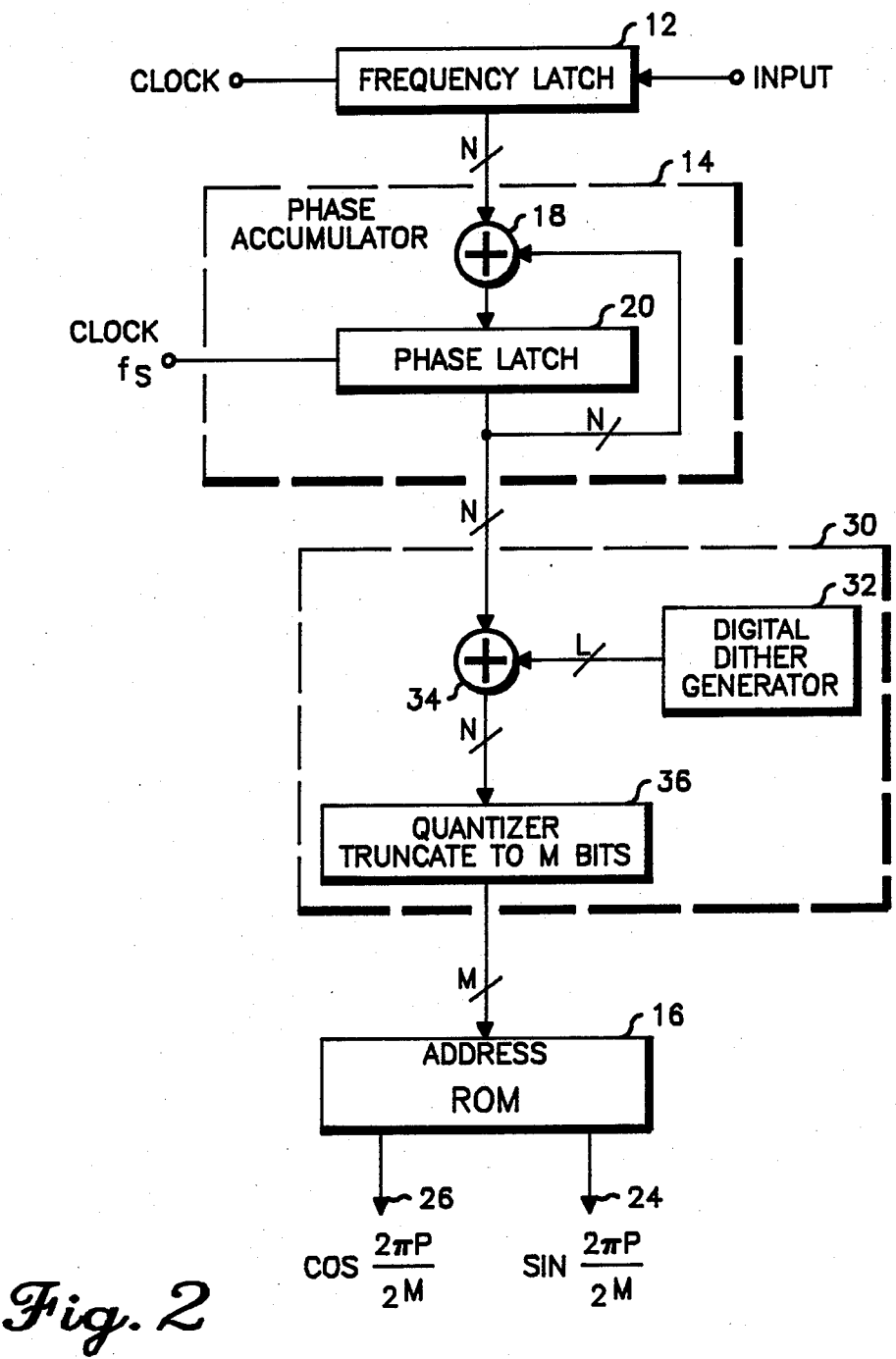
FIG. 2 is a block diagram of a digital oscillator incorporating the features of the present invention.

FIG. 2 is a block diagram of a digital oscillator for incorporating the features of the present invention. The conventional ROM-lookup oscillator 10 is modified by placing between the phase accumulator 14 and ROM 16 (or between the accumulator and ROM/complex multiplier combination in a factored ROM oscillator), a "dithering" means 30 comprising the combination of a digital dither generator 32, a digital adder 34, and a digital truncator or quantizer 36.

According to the principles of the present invention, the ROM size may be reduced without changing the frequency resolution by adding a "random", uniform density L bit dither signal in the least significant L bits to the N-bit number $(nk)_{(modulo\ 2N)}$ generated by the phase accumulator 14. This sum is truncated to M bit and passed to the ROM tables(s) 16. Since M<N, the ROM 16 size is reduced. In the direct lookup case, for example, the size is reduced by a factor of $2^{N-M}$. The ROM tables are of course modified to take into account the fewer number of phases to be looked up or calculated ($2^M$ phases instead of $2^N$).

Figure 3:
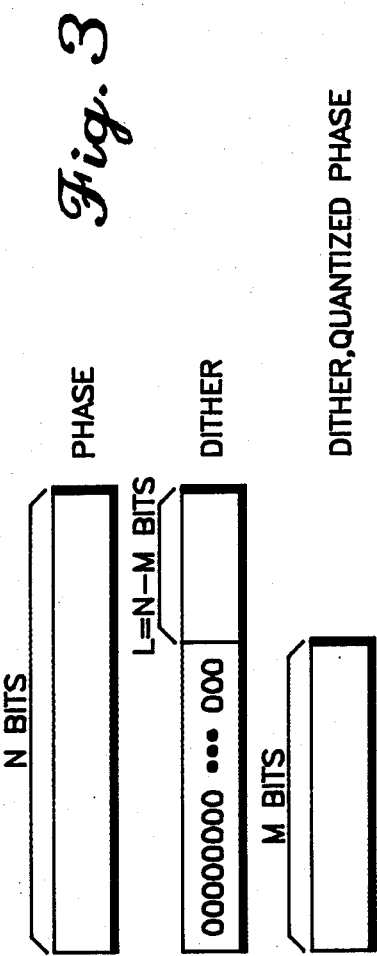
FIG. 3 is a diagram detailing the binary format of the output signals of the phase accumulator, dither generator, and combined/truncated binary output signal of the digital oscillator of FIG. 2.

FIG. 3 is a diagram detailing the binary format of the output signals of the phase accumulator, dither generator, and combined/truncated binary output signal of the digital quantizer 36 of FIG. 2. According to the teachings of the present invention, quantization or truncation of the binary phase word produces distortion or noise in the generated sine and cosine waveforms. Since the phase is a periodic function (sawtooth), the noise produced by quantization would also be periodic unless it is randomized somehow. Periodic noise would result in discrete "spurs" in the oscillator output spectrum which are undesirable in most applications if their level exceeds some threshold. Addition of the dither signal prior to phase quantization randomizes the phase noise, resulting in a more desirable white noise spectrum at the output. According to FIG. 3, the binary phase word is represented by a binary word of N bits. The dither signal comprises a pseudo-random binary word of L bits which is summed with the N bit phase word. The process results in a binary word N=L+M bits. This binary word is then truncated to a binary phase word of M bits which is relatively free of the spurious signals described above.

The effect of phase quantization on oscillator output noise can be shown by the following analysis. The desired oscillator output is described by the following equation:

$$w(n) = e^{j2\pi f_c nT} = e^{j\phi(n)}$$

If the phase angle is quantized with error $\delta(n)$, the actual output is described as follows:

$$\hat{w}(n) = e^{j[\phi(n)+\delta(n)]}$$

The error introduced is:

$$E(n) = \hat{w}(n) - w(n) = e^{j[\phi(n)+\delta(n)]} - e^{j\phi(n)}$$
$$= e^{j\phi(n)}[e^{j\delta(n)} - 1]$$

For the case of interest where $\delta(n)$ is very small (<<1), $e^{j\delta(n)}$ can be approximated by $1+j\delta(n)$, thus yielding:

$$E(n) = e^{j\phi(n)} \cdot j\delta(n)$$

The spectrum of E(n) can be seen as simply a frequency translation (and unimportant scaling by j) of the spectrum of the phase quantization noise $\delta(n)$. Thus if $\delta(n)$ is random or "white", so is E(n). Furthermore, the power of E(n) equals the power of $\delta(n)$, allowing the output noise level created by the phase noise to be easily estimated.

Choosing the power level of the dither signal involves a tradeoff between noise whitening effect and output noise power level. As the dither power is increased (by increasing the number of bits, L, in the dither signal), the noise becomes more whitened, but the total phase noise power increases as well. It can be shown that if the dither signal exhibits a uniform probability density, the choice of L=N−M results in the preferred level of dither power since it represents the smallest dither signal necessary to completely whiten the phase quantization noise. Thus, in the preferred implementation, the number of dither bits L equals the number of bits discarded in the truncation process, as shown in FIG. 3. It may be noted that dither signals exhibiting other than a uniform probability density may be utilized. However, a uniform density is preferred as it is the most easily generated.

With L=N−M, the variance (power) of the phase noise is equal to 2 times the equivalent phase variance of the dither signal. Given a desired frequency resolution, determined by N and $f_s$, then L and M, and hence the required ROM size, are determined by the allowable level of white noise at the oscillator output.

As an example, with $f_s = 20$ MHz, and $N = 20$ bits, the frequency resolution is 19.07 Hz. Truncating to $M = 17$ bits (to reduce ROM size by a factor of 8) without dither creates spurs in the oscillator output, which for one particular frequency are 98 db below the level of the desired signal. Addition of a 3-bit dither signal prior to truncation whitens the error signal, eliminating the spurs. According to the principles of the present invention, the frequency resolution of the digital oscillator, for a given level of output noise, can be increased indefinitely by simply adding more bits to the frequency and phase latches, and to the dither signal. The ROM size, determined by M, remains constant.

Figure 4:
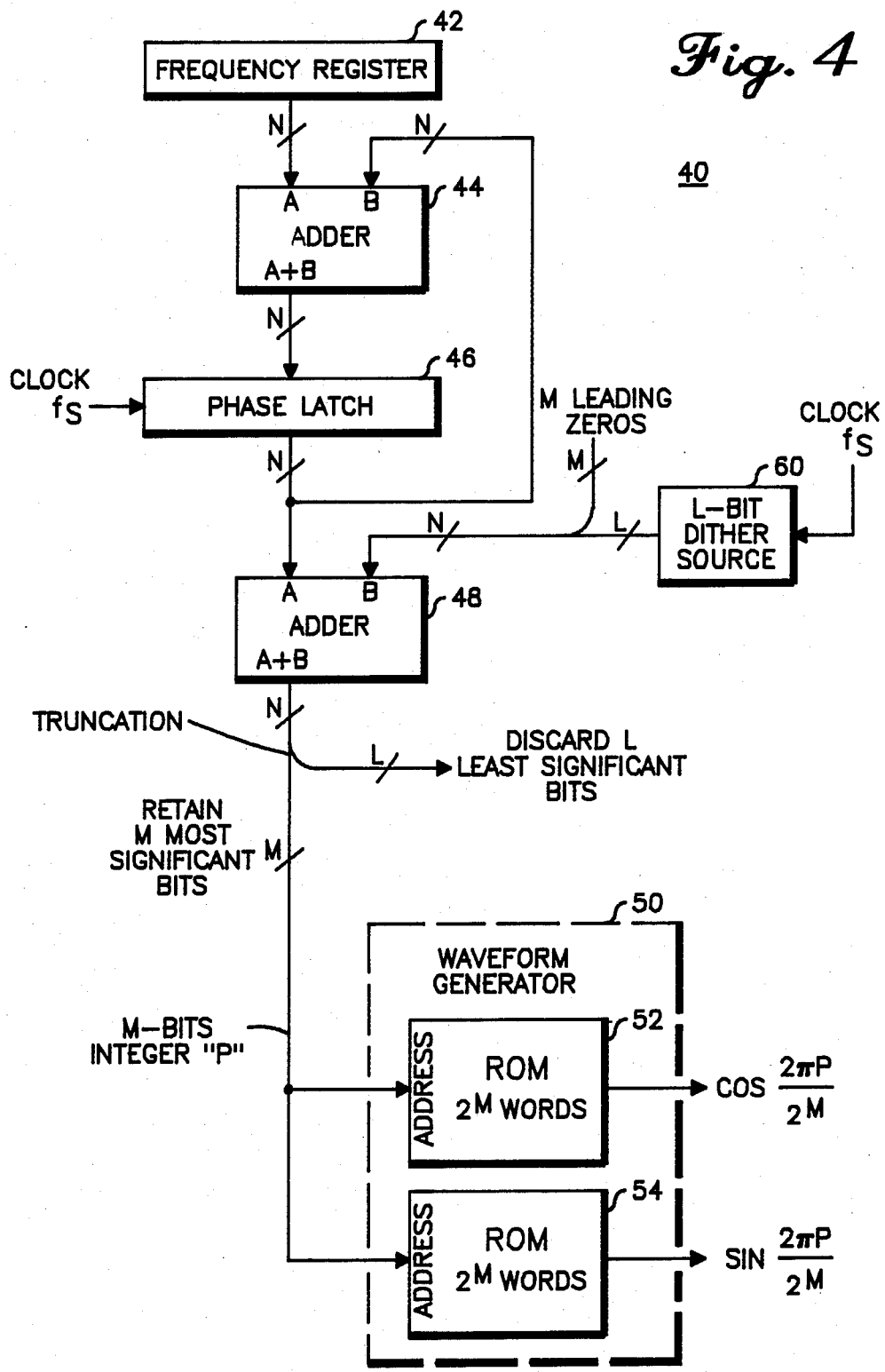
FIG. 4 is a more detailed schematic and block diagram of the improved digital oscillator of the present invention.

Referring now to FIG. 4, the digital oscillator 40, as implemented using the direct-ROM approach, is depicted in schematic diagram form. Frequency information, in the form of an N bit binary number proportional to the desired frequency, is loaded into the frequency latch 42. Frequency latch 42 may be realized in many different forms. For example, assuming that $N = 20$, five cascaded 74LS175's (Quad D flip-flops), manufactured by Motorola, Inc., Box 2092, Phoenix, Ariz., 85036, and others, provide an acceptable implementation. Those skilled in the art will appreciate that channel frequency latch 42 may be loaded by various means. For example, in a fixed frequency oscillator the frequency latch could be permanently loaded with a single binary number. For variable frequency oscillators, frequency latch 42 could be loaded from an EPROM or ROM look-up table or calculated and latched by a microprocessor.

The output of frequency latch 42 is coupled to a binary summer 44. It will be understood by those skilled in the art that the following discussion of digital oscillator 40 all coupling lines in between the functional blocks are in fact multi-bit binary words and not single connections. The output of adder 44 is coupled to phase latch 46. Phase latch 46 can be implemented as an N bit binary latch of the type described above. Further, the output of phase latch 46 is fed back into summer 44 to be added (modulo $2^N$) to the binary number representing the frequency information located in the frequency latch 42. The output of phase latch 46 is updated once every clock pulse which is generally the sampling frequency. The result of this accumulation operation is that the output of phase latch 46 is a binary number proportional to the phase of the desired oscillator output signals COS $2\pi f_c$nt and SIN $2\pi f_c$nt.

In prior implementations the N-bit output of phase latch 46 is often applied directly as the address to ROM lookup tables containing the desired cosine and sine values. Recall that the frequency resolution of the oscillator is defined by the data path width (N) of the frequency and phase registers and by the sampling rate $f_s$. A straight forward method of increasing frequency resolution is to increase N by adding more bits to the phase latch (and frequency register), and to increase the size of the ROM lookup tables. However this can be an expensive solution since the ROM must double in size for each additional bit added to the data path. Another option, often used in prior oscillators, is to add the necessary bits to the phase latch but to truncate the binary phase number before it is used to address the ROM tables. However, this introduces periodic phase quantization noise and causes undesirable spurs in the oscillator output signals.

According to the principles of the present invention, the frequency resolution of the digital oscillator may be enhanced, without increasing ROM size and without introducing spurs in the output, by adding a binary dither signal to the output of phase latch 46 before truncating. To accomplish this, digital oscillator 40 is provided with an L-bit dither source 60, which generates an L-bit wide, uniform density pseudorandum "white noise" signal. Dither source 60 is clocked at the sampling frequency $f_s$, so as to provide a new L-bit dither word for every phase word output from phase latch 46. An N-bit dither word is formed by appending $M = N - L$ leading zeroes to the L-bit dither word output from dither source 60. This composite N-bit dither signal is added to the N-bit output of phase latch 46 by N-bit binary adder 48, in Modulo $2^N$ fashion. The sum output of adder 48 is then truncated to M bits. In practice this truncation process is achieved by simply ignoring the least significant bits produced at the output of digital adder 48. The addition of the dither signal to the phase signal prior to truncation causes the phase noise created by such truncation to be desirably whitened, eliminating output spurs. The truncation operation itself allows for reduced ROM size.

The M-bit binary word retained after truncation is coupled to the address inputs of ROM's 52 and 54 which comprise waveform generator 50. Upon receiving an address, ROM's 52 and 54 output the digital binary words located at the specified address. As stated previously, the output signals of ROM's 52 and 54 are binary numbers proportional to the cosine and sine, respectively, of $2\pi p/2^M$, where p is the integer corresponding to the M-bit address input. For example, if $M = 8$, the ROM table entries may be configured as shown below in Table 1.

TABLE 1

| Address (p) | Contents of COS ROM at address 'p' | Contents of SIN ROM at address 'p' |
| --- | --- | --- |
| 0 | COS 0 | SIN 0 |
| 1 | COS $2\pi/256$ | SIN $2\pi/256$ |
| 2 | COS $2\pi/128$ | SIN $2\pi/128$ |
| 3 | COS $2\pi \cdot 3/256$ | SIN $2\pi \cdot 3/256$ |
| 4 | COS $2\pi/64$ | SIN $2\pi/64$ |
| . | | |
| . | | |
| 255 | COS $2\pi \cdot 255/256$ | SIN $2\pi \cdot 255/256$ |

The waveform generator 50 comprising ROM's 52 and 54 represents a direct ROM lookup approach. The principles of the present invention also apply to a factored ROM lookup approach, whereby ROM's 52 and 54 are replaced by a combination of ROM lookup table and complex phasor multiplication means, as was previously discussed.

A digital adder suitable for use with the apparatus of the present invention may be of a type constructed with several 74LS181 4-bit arithmetic logic unit devices, connected in parallel. These devices are shown and described in a data manual entitled "Motorola Schottky TTL Data Book", available from Motorola, Inc., Box 20912, Phoenix, Ariz. 85036. ROMs 52 and 54 may be formed by a variety of well known ROM devices such as a 82LS181 available from Signetics Corporation, 811 E. Argues Avenue, P.O. Box 3409, Sunnyvale, Calif., 94088, and described in the "Signetics Bipolar Memory Data Manual".

Figure 5:
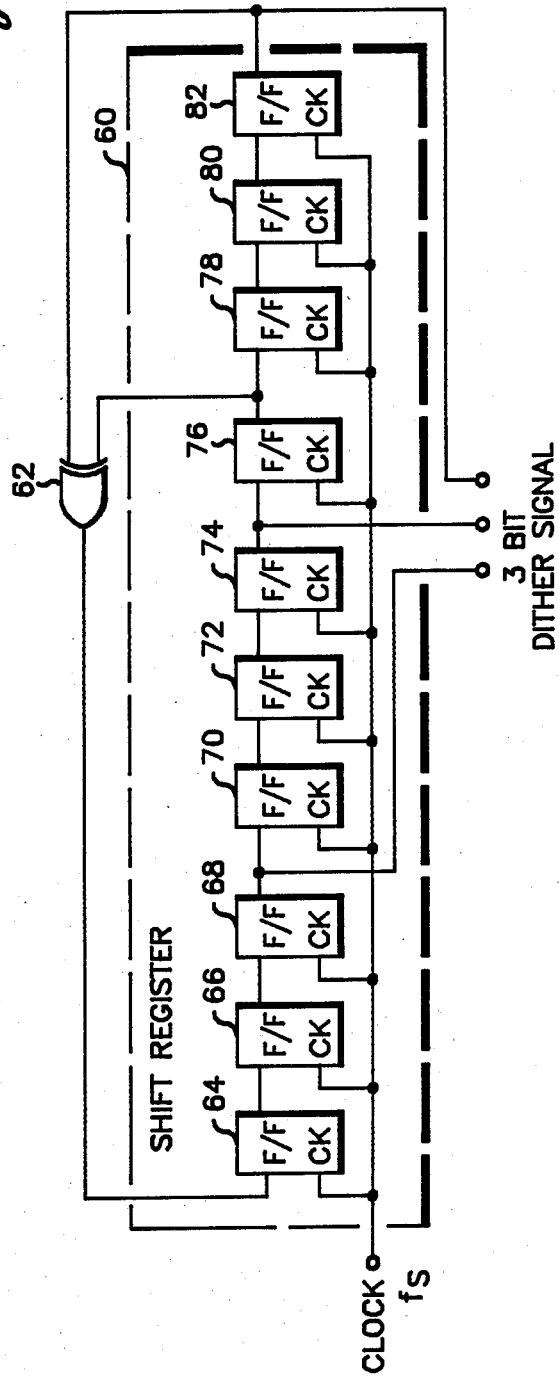
FIG. 5 is a schematic diagram of a maximal-length feedback shift register which may be advantageously used to generate an L-bit dither signal which is required by the improved digital oscillator of FIG. 4.

FIG. 5 is a schematic diagram of an example of a type of digital dither generator compatible with the digital oscillator of the present invention. A digital dither signal can be generated by any of several well-known pseudorandom sequence generation techniques. One type of dither, or random number generator is shown and described in a paper by G. I. Donov, A High-Speed Random-Number Generator, RADIO ELECTRONICS AND COMMUNICATIONS SYSTEMS, V25, No. 4, pp. 88–90, 1982.

Referring now to FIG. 5, a feedback shift register pseudorandom sequence generator which may be advantageously employed in the practice of the present invention is shown in schematic form. The exemplary sequence generator of FIG. 5 is used to provide a 3-bit digital dither signal to the binary adder 48 of FIG. 4. The dither generator 60 includes a 10-bit shift register which may be formed of a plurality of flip-flops 64 through 82 which are connected in a cascade fashion. A parallel 3-bit dither signal is tapped from the shift register at the outputs of flip-flops 68, 74 and 82 respectively. The inputs to an Exclusive-Or gate 62 are coupled to the outputs of flip-flops 76 and 82. The output of Exclusive-Or gate 62 is coupled to the input of flip-flop 64. The shift register is clocked at the sampling rate $f_s$ producing a 3-bit pseudo-random dither signal at the rate $f_s$ which is added to the output of the phase latch 46 of FIG. 4. The flip-flops 64–82 and the Exclusive-Or gate 62 as well as the other devices used in the practice of the present invention may be any of several well known logic devices, however, high speed TTL devices are particularly well adapted for the practice of the present invention. Implementations employing other logic families will also be obvious to one of ordinary skill in the art. The dither generator of FIG. 5 is set forth as an example of one type of digital dither generator which performs satisfactorily with the digital oscillator of the present invention. It would be obvious to one skilled in the art that many other digital dither generators could also be advantageously employed, provided the digital dither generator provides a pseudorandom sequence of L-bit numbers whose period is at least as long as $2^N$ samples, and whose probability density is uniform, in order for the phase noise produced by truncation to be "whitened".

To summarize the present invention allows ROM-lookup type digital oscillators to be implemented with arbitrarily fine frequency resolution without the need for very large amounts of ROM, and without creating undesirable spurs at the output. Frequency resolution of the digital oscillator is increased by summing the output of a digital phase accumulator with the output of a source of digital pseudorandom white noise, and truncating the least significant bits of the resultant digital word. The ROM size is simply determined by the allowable level of white noise present in the oscillator's output. Accordingly, other uses and modifications will be obvious to one of ordinary skill in the art without departing from the spirit and scope of the present invention.

We claim:

1. A digital oscillator having improved frequency resolution, said digital oscillator comprising:
   (a) latching means for inputting a binary signal which indicates the desired operating frequency for the digital oscillator;
   (b) phase accumulator means coupled to said latching means for generating a sequence of binary words, representing phase, corresponding to the desired operating frequency for the digital oscillator;
   (c) dither generator means for generating a signal comprising random digital noise;
   (d) digital summation means for combining the respective outputs of said phase accumulator means and said digital dither generator means;
   (e) truncating means for selecting the most significant portion of the output of said digital summation means; and
   (f) direct ROM look-up means, coupled to the output of said truncating means, for producing a sequential digital signal which corresponds to an oscillating sinusoidal signal of said desired operating frequency.

2. A method for improving frequency resolution in a digital oscillator, said method comprising the steps of:
   (a) inputting a binary signal which indicates the desired operating frequency for the digital oscillator;
   (b) generating a sequence of binary words, representing phase, corresponding to the desired operating frequency for the digital oscillator;
   (c) generating a digital dither signal comprising random digital noise;
   (d) summing the respective generated phase words and digital dither words;
   (e) selecting the most significant portion of the summed digital phase and dither words; and
   (f) producing a sequential digital signal which corresponds to an oscillating sinusoidal signal of said desired frequency, by addressing a ROM lookup means with said selected significant portion of said combined digital phase and dither words.

3. A method for improving frequency resolution in a digital oscillator, said method comprising the steps of:
   (a) inputting a binary signal which indicates the desired operating frequency for the digital oscillator;
   (b) generating a sequence of binary words, representing phase, corresponding to the desired operating frequency for the digital oscillator;
   (c) generating a digital dither signal comprising random digital noise;
   (d) summing the respective generated phase words and digital dither words;
   (e) selecting the most significant portion of the summed digital phase and dither words; and
   (f) producing a sequential digital signal which corresponds to an oscillating sinusoidal signal of said desired frequency, by addressing a factored ROM lookup means with said selected significant portion of said combined digital phase and dither words.

4. A digital oscillator having improved frequency resolution, said digital oscillator comprising:
   (a) latching means for inputting a binary signal which indicates the desired operating frequency for the digital oscillator;
   (b) phase accumulator means coupled to said latching means for generating a sequence of binary words, representing phase, corresponding to the desired operating frequency for the digital oscillator;
   (c) dither generator means for generating a signal comprising random digital noise;
   (d) digital summation means for combining the respective outputs of said phase accumulator means and said digital dither generator means;

(e) truncating means for selecting the most significant portion of the output of said digital summation means; and (f) factored ROM look-up means, coupled to the output of said truncating means, for producing a sequential digital signal which corresponds to an oscillating sinusoidal signal of said desired operating frequency.

5. The improved digital oscillator of claim 1 or 4, wherein said phase accumulator means has a length of N bits.

6. The improved digital oscillator of claim 5, wherein N=20.

7. The improved digital oscillator of claim 1 or 4, wherein said dither signal comprises an L bit random digital noise signal.

8. The improved digital oscillator of claim 7, wherein L=3.

9. The improved digital oscillator of claim 1 or 4, wherein said truncating means has a length of M bits.

10. The improved digital oscillator of claim 9, wherein M=17.

11. The improved digital oscillator of claim 1 or 4, wherein said dither signal has a uniform probability density.

12. The improved digital oscillator of claim 1 or 4, wherein dither generator means comprises a feeback shift register pseudorandom sequence generator.

13. The improved digital oscillator of claim 12, wherein said feedback shift register has a length of 10 bits.

14. The improved digital oscillator of claim 1 or 4, wherein the length of said latching means and said phaae accumulator means are equal.

* * * * *

UNITED STATES PATENT AND TRADEMARK OFFICE
CERTIFICATE OF CORRECTION

PATENT NO. : 4,652,832
DATED : March 24, 1987
INVENTOR(S) : JASPER, STEVEN C.

It is certified that error appears in the above-identified patent and that said Letters Patent is hereby corrected as shown below:

Column 3, line 21, "rate" should be --cycle--.

Column 3, line 57, "bit" should be --bits--.

Column 10, line 18, "phaae" should be --phase--.

Signed and Sealed this

Twenty-fifth Day of August, 1987

Attest:

DONALD J. QUIGG

Attesting Officer     Commissioner of Patents and Trademarks